United States Patent
Bucher et al.

(10) Patent No.: US 10,337,934 B2
(45) Date of Patent: Jul. 2, 2019

(54) NON-CONTACT MAGNETOSTRICTIVE SENSOR ALIGNMENT

(71) Applicant: General Electric Company, Schenectady, NY (US)

(72) Inventors: Martin Bucher, Garching N. Munchen (DE); David Folkner, Greenville, SC (US); Dan Tho Lu, Minden, NV (US); Lysle Turnbeaugh, Minden, NV (US); Brian F. Howard, Minden, NV (US)

(73) Assignee: General Electric Company, Schenectady, NY (US)

( * ) Notice: Subject to any disclaimer, the term of this patent is extended or adjusted under 35 U.S.C. 154(b) by 216 days.

(21) Appl. No.: 15/606,605

(22) Filed: May 26, 2017

(65) Prior Publication Data

US 2018/0340846 A1    Nov. 29, 2018

(51) Int. Cl.
| | |
|---|---|
| *G01D 11/30* | (2006.01) |
| *G01D 11/24* | (2006.01) |
| *G01L 1/12* | (2006.01) |
| *G01D 5/244* | (2006.01) |

(52) U.S. Cl.
CPC ............ *G01L 1/125* (2013.01); *G01D 11/245* (2013.01); *G01D 11/30* (2013.01); *G01D 5/24442* (2013.01)

(58) Field of Classification Search
CPC ...... G01D 11/245; G01D 11/30; G01L 1/125; G01L 5/24442

USPC .......................................................... 73/431
See application file for complete search history.

(56) References Cited

U.S. PATENT DOCUMENTS

| | | | | |
|---|---|---|---|---|
| 4,655,548 A | * | 4/1987 | Jue ........................ | G02B 7/005 348/143 |
| 5,020,357 A | * | 6/1991 | Kovacevic ............. | G01L 25/00 248/371 |
| 7,474,296 B2 | * | 1/2009 | Obermeyer ............ | G05G 9/047 345/156 |
| 7,642,741 B2 | * | 1/2010 | Sidman ................ | F16M 11/041 318/638 |
| 9,625,362 B2 | * | 4/2017 | Carbo ................... | G01L 5/0052 |
| 2009/0217733 A1 | * | 9/2009 | Stachow ................ | G01P 15/18 73/1.37 |
| 2018/0078266 A1 | * | 3/2018 | Fry .......................... | A61F 5/11 |

\* cited by examiner

*Primary Examiner* — Jacques M Saint Surin
(74) *Attorney, Agent, or Firm* — Mintz Levin Cohn Ferris Glovsky and Popeo, P.C.

(57) ABSTRACT

Systems, methods, and devices for positioning, orienting, and/or aligning a stress sensor assembly are provided. In some embodiments, a sensor assembly can be received within a retaining element of a sensor mounting assembly. The sensor mounting assembly can include the retaining element, an adjustment mechanism, a first member, a second member, and a third member. The adjustment mechanism can allow the sensor assembly to be displaced linearly in a proximal and/or distal direction. The first and second members can be pivotally coupled to enable the sensor assembly to be rotated about a first axis, and the second and third members can be pivotally coupled to allow the sensor assembly to be rotated about a second axis.

19 Claims, 11 Drawing Sheets

NON-CONTACT MAGNETOSTRICTIVE SENSOR ALIGNMENT

FIELD

Sensor alignment systems and methods are provided, and in particular systems and methods are provided for aligning a magnetostrictive sensor.

BACKGROUND

Ferromagnetic materials can have magnetostrictive properties that can cause the materials to change shape in the presence of an applied magnetic field. The inverse can also be true. When a stress is applied to a conductive material, magnetic properties of the material, such as magnetic permeability, can change. A magnetostrictive sensor can sense the changes in magnetic permeability and, because the changes can be proportional to the amount of stresses applied to the conductive material, the resulting measurement can be used to calculate the amount of stress.

The changes in the magnetic permeability arising from an application of stress to the conductive material, however, can be small, making accurate measurement difficult. Some magnetostrictive sensors can be manually aligned and a gap is set by a gauge. Such alignment can result in different air gaps being defined between each detector pole of the sensor.

SUMMARY

Sensor mounting assemblies and methods for mounting a sensor relative to an object to be tested are provided herein. In one embodiment, a sensor mounting assembly is provided and includes a retaining element configured to releasably engage a sensor assembly, an adjustment assembly coupled to the retaining element and having a rotatable member configured to cause translation of the retaining element along a first axis, and a frame assembly. The frame assembly can include a first member coupled to the adjustment assembly, a second member pivotally coupled to the first member about a second axis extending transverse to the first axis, and a third member pivotally coupled to the second member about a third axis extending transverse to the first and second axes. Pivotal movement of the first member relative to the second member can be configured to cause rotation of the retaining element about the second axis, and pivotal movement of the second member relative to the third member can be configured to cause rotation of the retaining element about the third axis.

In one embodiment, the first axis can be a vertical Z-axis, the second axis can be a horizontal X-axis, and the third axis can be a horizontal Y-axis. In certain embodiments, the second axis can be approximately orthogonal to the third axis.

The adjustment assembly can have various configurations, and in one embodiment it can include a movable member that is slidably coupled to a frame. The retaining element can be coupled to the movable member such that it can move with the movable member. The movable member can be disposed between the frame and the first member. In certain aspects, first axis can extend perpendicular to the second and third axes.

The retaining element can also have various configurations, and in one embodiment the retaining element can be a clamp configured to engage a sensor assembly.

In another embodiment, pivotal movement of the first member relative to the second member can be limited. For example, the first member can include a bore, and the second member can include an elongated slot. An elongated member can extend through the bore and the elongated slot at a location offset from the first axis such that the elongated member limits pivotal movement of the first member relative to the second member by a distance equal to a length of the elongates slot.

In other embodiments, the first member can be pivotally coupled to the second member by a first pivot coupling that extends through a first pivot bore in the first member and a second pivot bore in the second member. The second member can be pivotally coupled to the third member by a second pivot coupling that extends through a third pivot bore in the second member and a fourth pivot bore in the third member.

In another embodiment, a sensor assembly is provided and includes a sensor housing having a first pair of detection elements that define a first detection axis, and a second pair of detection elements that define a second detection axis. The sensor assembly can also include a sensor mount having an adjustment mechanism having a frame and a movable member slidably coupled to the frame, and a retaining element coupled to and slidably movable with the movable member of the adjustment mechanism. The retaining element can be configured to releasably engage the sensor housing. The sensor mount can also include a first member coupled to the frame of the adjustment mechanism, and a second member pivotally coupled to the first member about a first axis aligned with the first detection axis. Pivotal movement of the first member relative to the second member about the first axis can pivotally move the sensor housing about the first detection axis. A third member can be pivotally coupled to the second member about a second axis aligned with the second detection axis, and pivotal movement of the second member relative to the third member about the second axis can pivotally move the sensor housing about the second detection axis.

In certain aspects, the adjustment mechanism can include a rotatable member configured to cause slidable movement of the movable member along the frame.

In other aspects, the first member can include first and second bores, and the second member can include a third bore and a first elongated slot. The first bore can be aligned with the third bore along the first axis, and the second bore can be aligned with the first elongated slot. An elongated member can be disposed through the second bore and the first elongate slot for limiting pivotal movement of the first member relative to the second member.

In other embodiments, the second axis can be approximately orthogonal to the first axis.

Methods for adjusting a position of a sensor assembly relative to a structure to be tested are also provided. In one embodiment, the method can include rotating a sensor housing about a first axis to adjust a yaw of the sensor housing relative to a retaining element having the sensor housing seated therein, actuating an adjustable member to cause the sensor housing to translate along the first axis, rotating the retaining element with the sensor housing therein about a second axis to adjust a pitch of the sensor housing, and rotating the retaining element with the sensor housing therein about a third axis to adjust a roll of the sensor housing.

Actuating the adjustable member can cause a movable member mated to the retaining element to slide relative to a frame. Rotating the retaining element with the sensor housing therein about a second axis can cause a first member of a frame assembly coupled to the retaining element to pivot relative to a second member of the frame assembly. Rotating the retaining element with the sensor housing therein about a third axis can cause the second member of a frame assembly to pivot relative to a third member of the frame assembly.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Systems, methods, and devices for positioning, orienting, and/or aligning a stress sensor relative to a structure to be tested are discussed herein. It can be desirable to monitor certain components, such as a shaft of a turbine, to ensure that it is functioning within an appropriate operating range. One way to monitor such components is to use a stress sensor to sense stress within the material. In order to minimize measurement error, the stress sensor can be properly aligned relative to the component prior to taking a stress measurement. For example, when the stress sensor is properly aligned, a change in a size of a gap between the sensor and a surface of a target can result in approximately equal changes in raw stress signals output from a number detection elements that the stress sensor can have, where the raw stress signals can correspond to values of stress in the target. Accordingly, it can be beneficial to use a sensor mounting assembly that allows the stress sensor to be positioned appropriately such that accurate stress measurements can be obtained. Otherwise, if the size of the gap changes, raw stress signals from each of the number detection element can change by significantly different amounts, which can result an inaccurate stress measurements.

Figure 1A:
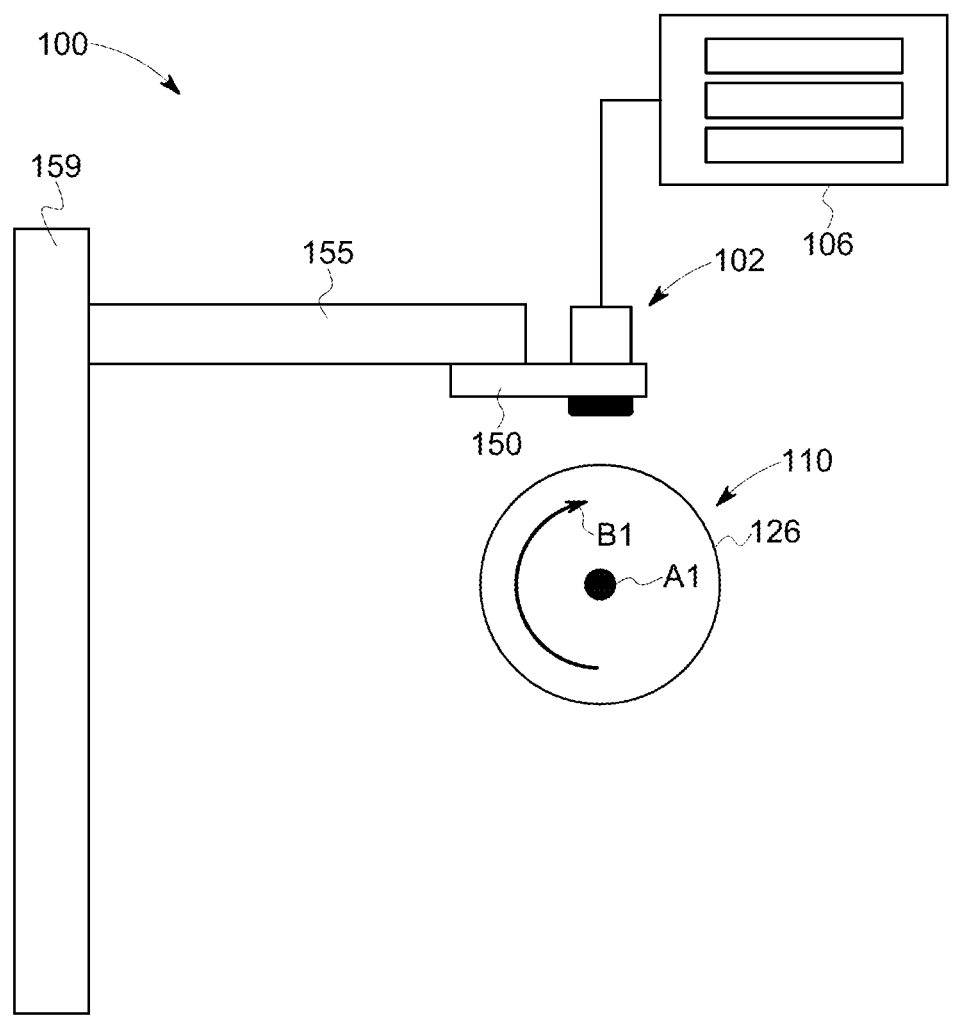
FIG. 1A is a side view of one embodiment of a sensor system.

FIG. 1A illustrates an exemplary embodiment of a sensor system 100 that can be used to detect stress, such as torque, bending, and/or axial loading, applied to a target. In general, the sensor system 100 can include a sensor assembly 102 which can be received within a sensor mounting assembly 150 or mounting bracket, and positioned proximate to a surface 126 of a target 110 such as, e.g., a rotatable shaft, to be tested. As an example, the target 110 can rotate about axis A1, as indicated by arrow B1. The sensor mounting assembly 150 can facilitate adjusting and/or maintaining the position of the sensor assembly 102 relative to the target 110. As illustrated in FIG. 1A, the mounting assembly 150 can be coupled to an extension arm 155, which can be coupled to a rigid support 159. The mounting assembly 150 can facilitate proper alignment of the sensor assembly 102 relative to the target 110, and it can maintain proper orientation and alignment of the sensor assembly 102 with regard to the target 110. The sensor assembly 102 can send and receive signals to and from a control and processing module 106 for conducting measurements. The signals can be, e.g., voltage and/or current signals.

Figure 1B:
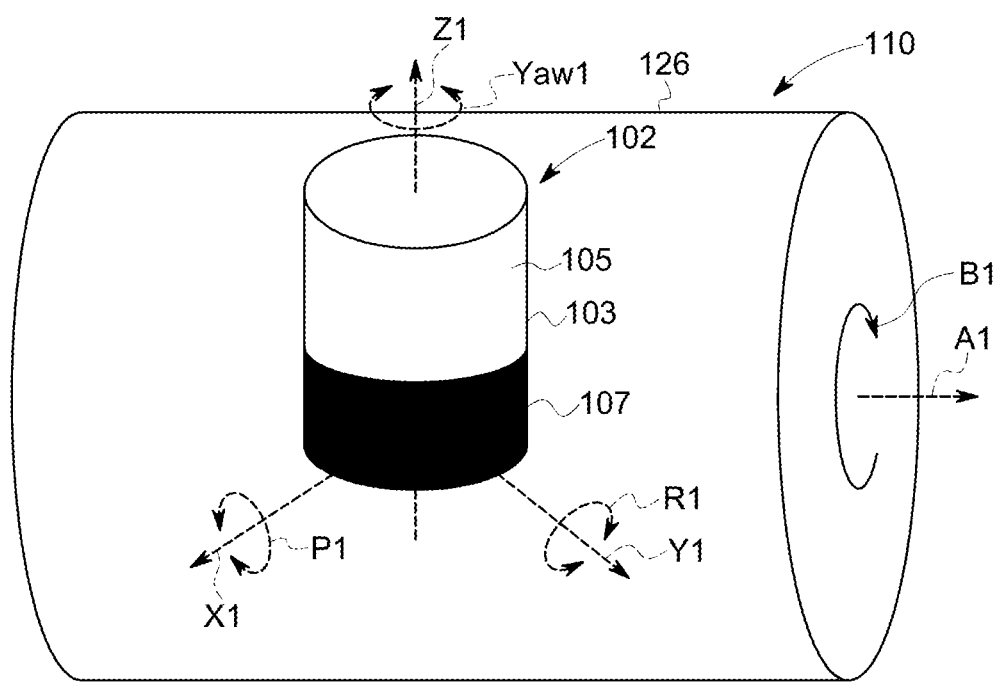
FIG. 1B is an enlarged perspective view of a sensor assembly of the sensor system shown in FIG. 1A.
Figure 1C:
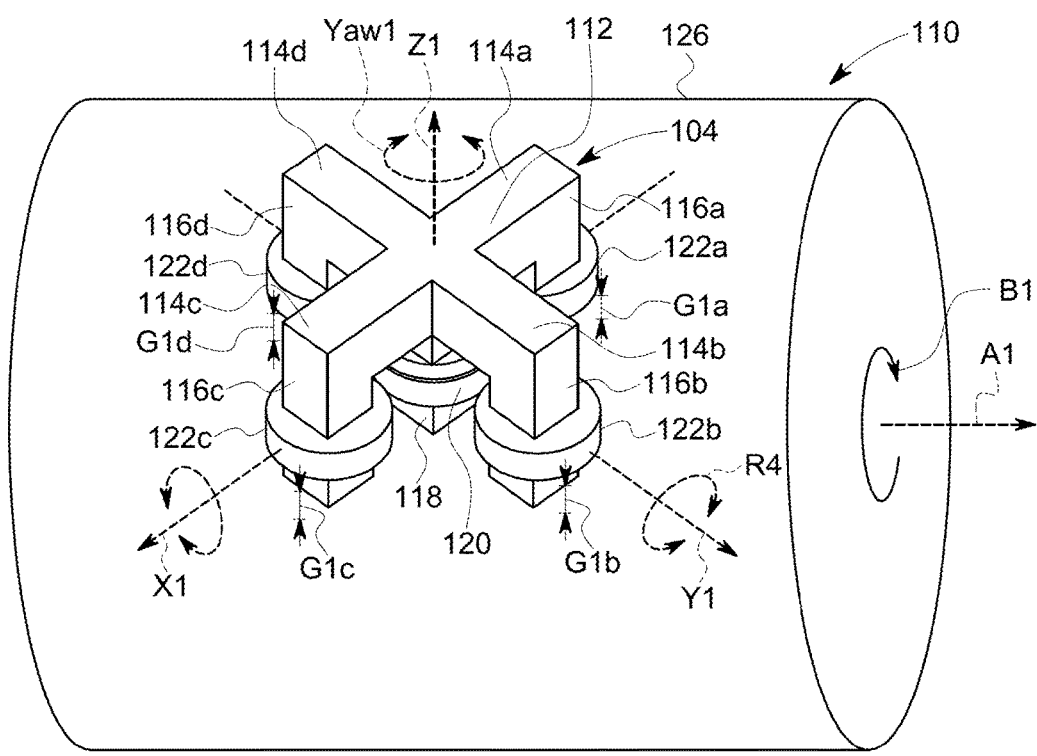
FIG. 1C is a perspective view of one embodiment of a sensor head.

While the mounting assembly 150 disclosed herein can be used with various sensor assemblies, FIGS. 1B-1C illustrate one exemplary embodiment of a sensor assembly 102. The sensor assembly is described in more detail in U.S. application Ser. No. 15/598,062 entitled "Non-Contact Magnetostrictive Sensor with Gap Compensation Field," filed on May 17, 2017, is incorporated by reference herein in its entirety. As shown in FIG. 1B, the sensor assembly 102 can include a housing 103 having a proximal portion 105 and a distal portion 107. In some embodiments, the proximal portion 105 can be made out of, e.g., stainless steel, aluminum, or another metal, and the distal portion 107 can be made out of a non-conductive material such as, e.g., a ceramic or a moldable, machinable, polymer. The sensor assembly 102 can include a sensor head disposed within the housing 103. The sensor head can include a drive element and at least one detection element that can be disposed within the distal portion 107 of the housing 103.

The sensor assembly is shown in more detail in FIG. 1C. As shown, the sensor assembly 102 includes a sensor head 104 having a support 112 with four support bars 114a, 114b, 114c, 114d that extend radially outward from a central axis Z1. The support bars 114a, 114b, 114c, 114d can have detection arms 116a, 116b, 116c, 116d that extend distally therefrom toward the target 110. In some embodiments, the number of support bars and/or detection arms may be greater than or fewer than four in some embodiments. A first pair of detection elements 122a, 122c can extend along and define an axis X1, and a second pair of detection elements 122d, 122b can extend along and define an axis Y1, which can extend orthogonal to the first axis. The support 112 can also include a central arm 118 that extends distally toward the target 110 along the central axis Z1. The sensor head 104 can further include the drive subsystem having a drive element 120 located on the central arm 118 of the support 112, and detection elements 122a, 122b, 122c, 122d located on the detection arms 116a, 116b, 116c, 116d.

As explained in the above mentioned application, the drive element can receive an input drive signal from the control and processing module 106 to generate a magnetic flux. The magnetic flux can travel from the drive element 120 through the target 110, and it can be detected by the first and second pair of detection elements. The detection elements 122a, 122b, 122c. 122d can then generate a raw stress signal based on the detected magnetic flux. The raw stress signals can be delivered to the control and processing module 106, and can be used to determine values of stress within the target 110.

The values of the raw stress signals can be sensitive to the alignment and positioning of the sensor assembly 102, and/or sensor head, relative to the target 110. Therefore, it can be beneficial to align the sensor assembly 102, and/or the sensor head, relative to the target. In an exemplary embodiment, a mounting assembly is provided to allow the sensor assembly to be adjustable about multiple axis to adjust a pitch, yaw, and/or roll of the sensor assembly. The mounting assembly can also allow a distance between the sensor assembly 102 and the target 110 to be adjusted. In certain exemplary embodiments, the mounting assembly is configured to allow a pitch of the sensor assembly to be adjusted about an axis X1 aligned with the first pair of detection elements 122a, 122c, and/or to allow a roll of the sensor assembly to be adjusted about an axis Y1 aligned with the second pair of detection elements 122d, 122b, as indicated by arrows P1 and R1 in FIGS. 1B and 1C. The mounting assembly can also be configured to allow a yaw of the sensor assembly 102 to be adjusted by rotating the sensor assembly 102 about axis Z1, as indicated by arrow Yaw1 in FIGS. 1B-1C.

FIGS. 2A-2F show one exemplary embodiment of a sensor mounting assembly 250, also referred to as a mounting bracket, that can be used to position, orient, and/or align a sensor assembly, such as sensor assembly 102. In general, the mounting assembly 250 can include at least one of a retaining element 252 that can releasably engage the sensor assembly, an adjustment assembly 254, and a mounting frame 251. The mounting frame 251 can include a first member 256, a second member 258, and a third member 260.

As shown in FIGS. 2A-2D, the retaining element 252 can be in the form of a substantially C-shaped clamp having a central bore 266 about defining an axis Z2. First and second pairs of spaced-apart arms 253a, 253b and 253c, 253d can extend outward from each end of the C-shaped clamp. The arms 253a, 253b, 253c, 253d can include threaded bores 255a, 255b, 255c, 255d for receiving fasteners 268a, 268b, such as threaded bolts for example, for drawing the arms 253a, 253b, 253c, 253d together to engage a sensor assembly within the central bore 266 of the clamp. In use, the sensor assembly can be positioned within the central bore 266 of the retaining element 252, and a yaw of the sensor assembly can be adjusted by rotating the sensor assembly about axis Z2, as indicated by Yaw2, until a desired alignment with respect to axes X2, Y2 is achieved. In an embodiment, the fasteners 268a, 268b can be threaded into the bores 255a, 255b and 255c, 255d to cause the retaining element 252 to clamp onto and frictionally engaging the sensor housing within the central bore 266. The coupling elements 268a, 268b can also be loosened to allow the sensor assembly to be removed from the retaining element, as desired.

As indicated above, the mounting assembly 250 can also include an adjustment assembly 254, which can be configured to allow slidable movement of the retaining element 252, and thus the sensor housing, along axis Z2, to thereby adjust a distance between the sensor assembly and a structure. The adjustment mechanism 254 can include a movable member 272 that can mate to the retaining element 252, and frame 276 having the movable member 272 slidably coupled thereto. A rotatable adjuster 274 can be coupled between the frame 276 and the movable member 272 for causing sliding movement of the movable member 272. In an exemplary embodiment, a spindle 278, shown in FIG. 2D, can extend through the frame 276 and can be mated to the movable member 272. The spindle 278 can be threadably coupled with the rotatable adjuster 274 such that rotation of the rotatable adjuster 274, indicated by arrow T2, can cause the spindle 278 to translate proximally and distally relative to the rotatable adjuster 274, thereby causing the movable member 272 to move proximally or distally relative to the frame 276. Accordingly, as the movable member 272 moves proximally or distally along axis Z2, the retaining element 252 and sensor housing can move proximally or distally. In some embodiments, other adjustment assemblies, such as a linear actuator, can be used in place of the adjustment assembly 254.

Figure 2A:
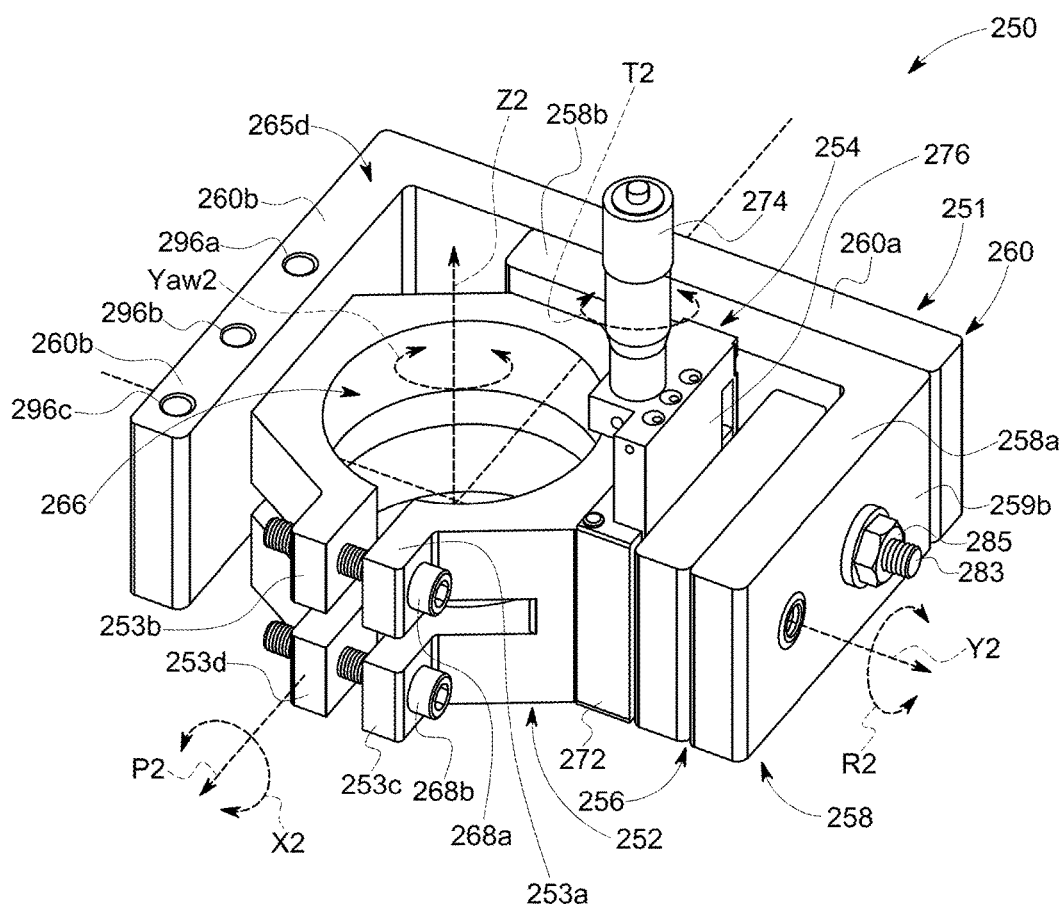
FIG. 2A is a perspective view of one embodiment of a sensor mounting assembly.
Figure 2B:
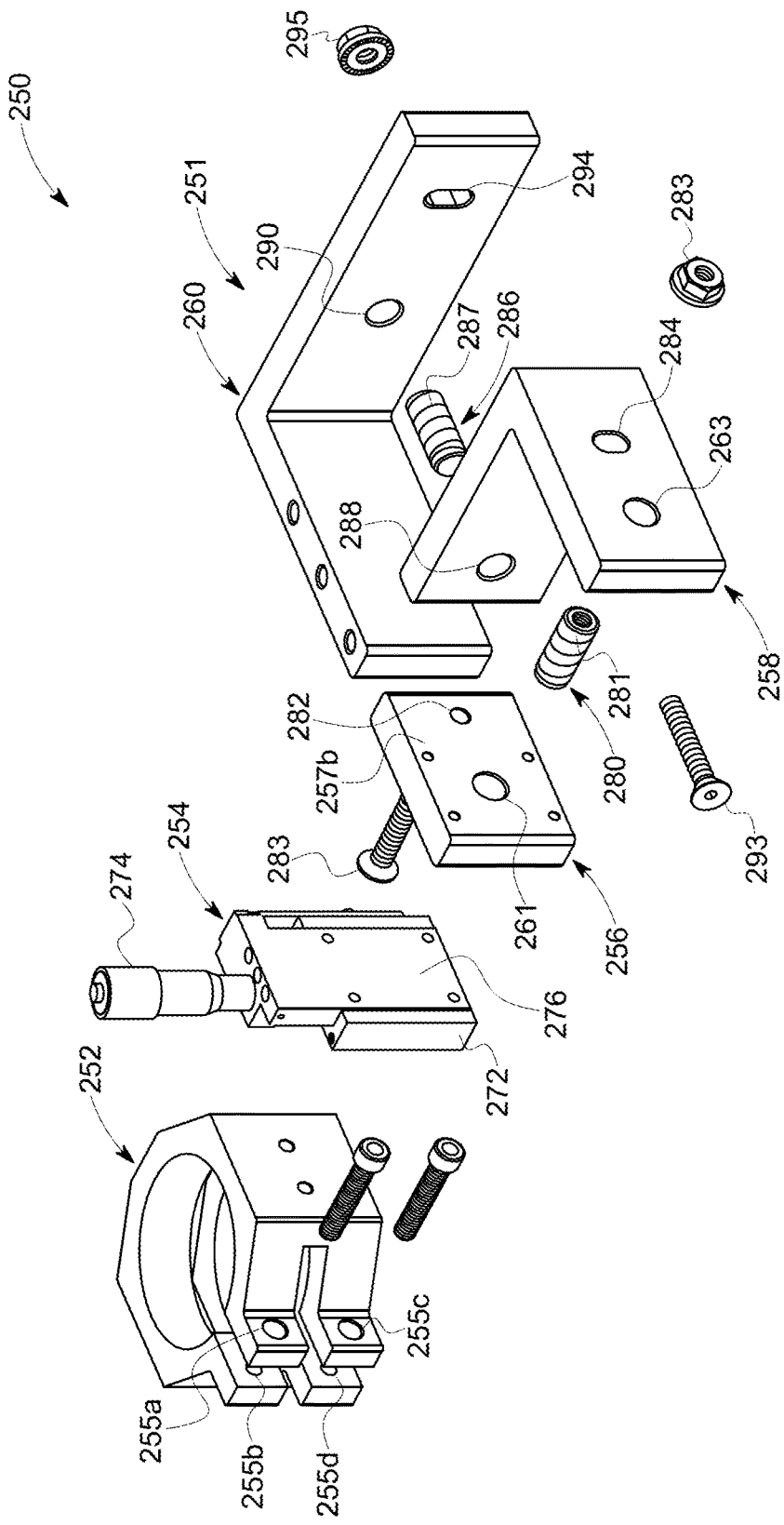
FIG. 2B is an exploded perspective view of sensor assembly shown in FIG. 2A.

As further shown in FIGS. 2A-2B, the mounting assembly 250 can also include the mounting frame 251 having the first member 256, the second member 258, and the third member 260. The first member 256 can generally be the shape of a rectangular prism. The second member 258 can have first and second aims 258a, 258b that can be coupled at their ends such that they form approximately a 90° angle between them. Similarly, the third member 260 can include first and second arms 260a, 260b that can be coupled at their ends such that they form approximately a 90° angle between them. The arms 258a, 258b, 260a, 260b of the second and third members 258, 260 can also be shaped as rectangular prisms. The shape of the first member 256, second member 258, and third member 260 may vary in different embodiments.

Figure 2C:
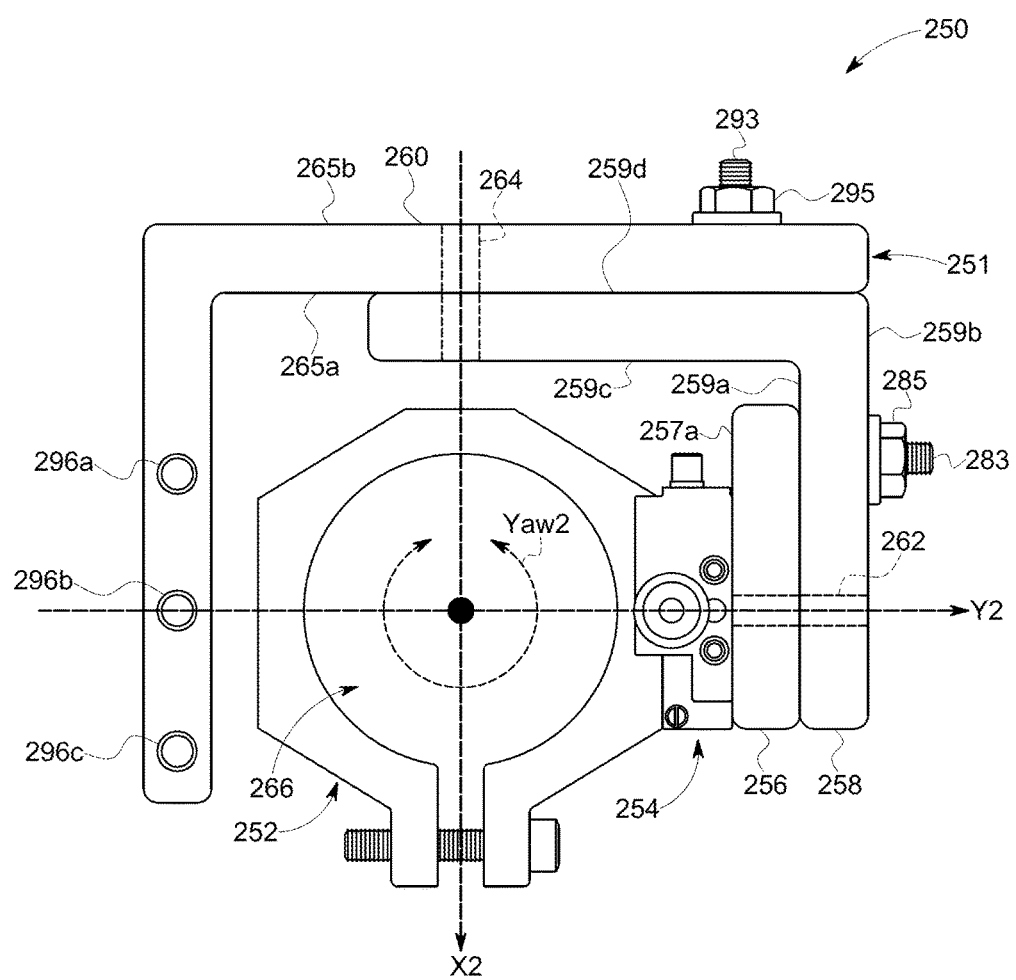
FIG. 2C is a top view of the sensor mounting assembly shown in FIG. 2A.
Figure 2D:
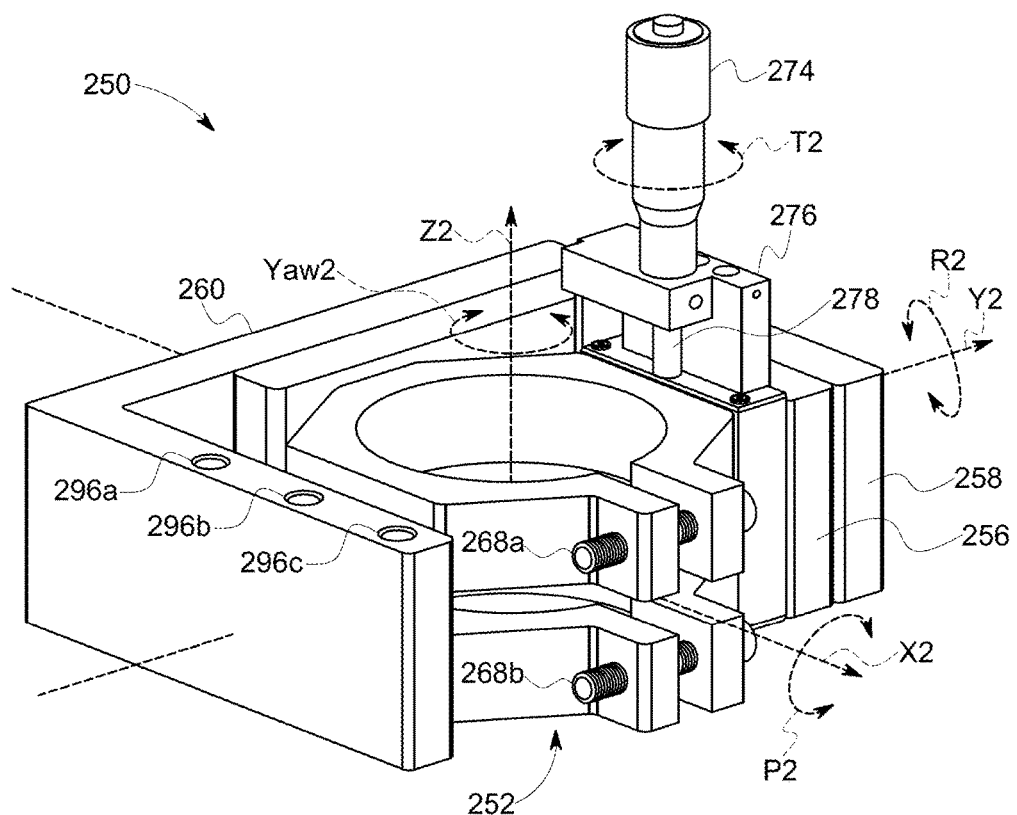
FIG. 2D is another perspective view of the sensor mounting assembly shown in FIG. 2A.

As illustrated in FIG. 2C, the first member 256 can have an inner surface 257a that is mated to the frame 276 of the adjustment mechanism 254. The first member 256 can have an outer surface 257b that is adjacent to an inner surface 259a of the first aim 258a of the second member 258. A pivotal connection can be formed between the first and second members 256, 258 such that a first pivot 262 is formed along axis Y2. As illustrated in FIGS. 2B-2C, the first pivot 262 can be formed by a first pivot coupling 280 that can extend through a first pivot bore 261 in the first member 256 and a second pivot bore 263 in the second member 258. The first pivot coupling 280 can be, e.g., a dowel pin. The first pivot bore 261 can extend from the inner surface 257a of the first member 256 to the outer surface 257b of the first member 256. The second pivot bore 263 can extend from the inner surface 259a of the first arm 258a of the second member 258 to an outer surface 259b of the first arm 258a of the second member 258. The first pivot coupling 280 can include a spiral groove 281 cut along its length to relieve trapped air and facilitate easy insertion into first and second pivot bores 261, 263. The first pivot 262 allows the first member 256 to rotate, or pivot, relative to the second member 258 about axis Y2, as indicated by arrow R2, to adjust a roll of the sensor assembly.

Figure 2E:
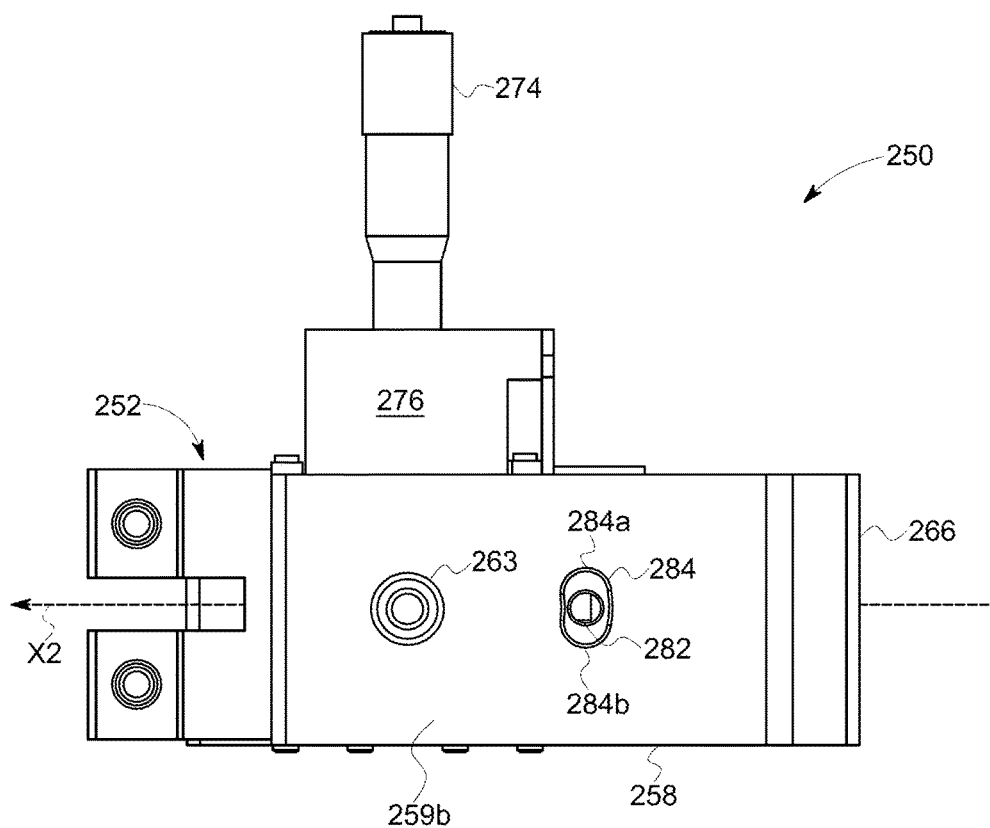
FIG. 2E is a right side view of the sensor assembly shown in FIG. 2A.

In some embodiments, the amount of rotation of the first member 256 relative to the second member 258 can be limited. As shown in FIGS. 2B and 2E, the first member 256 can include another bore 282 that can align with an elongated slot 284 in the first arm 258a of the second member 258. The bore 282 can extend from the inner surface 257a of the first member 256 to the outer surface 257b of the first member. The elongated slot 284 can extend from the inner surface 259a of the first arm 258a of the second member 258 to the outer surface 259b of the first arm 258a of the second member. The bore 282 and the elongated slot 284 can receive an elongate member 283, such as a bolt, that can extend from the inner surface 257a of the first member 256 to the outer surface 259b of the second member 258. The elongated slot 284 can have a radius of curvature that can be approximately equal to a distance from axis Y2 to a central axis of the bore 282. Therefore, when the elongate member 283 is inserted therethrough, rotation of the first member can be limited by radial travel of the elongate member 283 between ends 284a, 284b of the elongated slot 284. A distance between the ends 284a, 284b of the elongated slot 284 can be determined based on a desired amount of angular rotation of the first member 256 relative to the second member 258, and the distance from axis Y2 to the central axis of bore 282. In some embodiments, the elongate member 283 can be retained within the bore 282 and the elongated slot 284 by a coupling element 285. The coupling element 285 can be, e.g., a nut. When a desired amount of rotation about axis Y2, or roll, is achieved, the coupling element 285 can be tightened to secure the position of the first member 256 relative to the second member 258.

In a similar manner to the pivot coupling between the first member 256 and the second member 258, the second member 258 can be pivotally coupled to the third member 260. In one embodiment, an outer surface 259d of the second arm 258b of the second member 258 can be adjacent to an inner surface 265a of the first arm 260a of the third member 260. The second pivot 264 can be formed by a second pivot coupling 286 that can extend through a third pivot bore 288 in the second member 258 and a fourth pivot bore 290 in the third member 260. The second pivot coupling 286 can be, e.g., a dowel pin. The third pivot bore 288 can extend from the inner surface 259c of the second arm 258b of the second member 258 to the outer surface 259d of the second arm 258b of the second member 258. The fourth pivot bore 290 can extend from the inner surface 265a of the first arm 260a of the third member 260 to an outer surface 265b of the first arm 260a of the third member 260. The second pivot coupling 286 can include a spiral groove 287 cut along its length to relieve trapped air and facilitate easy insertion into third and fourth pivot bores 288, 290. The second pivot 264 allows the second member 258 to rotate, or pivot, relative to the third member 260 about axis X2, as indicated by arrow P2, to adjust a pitch of the sensor assembly.

Figure 2F:
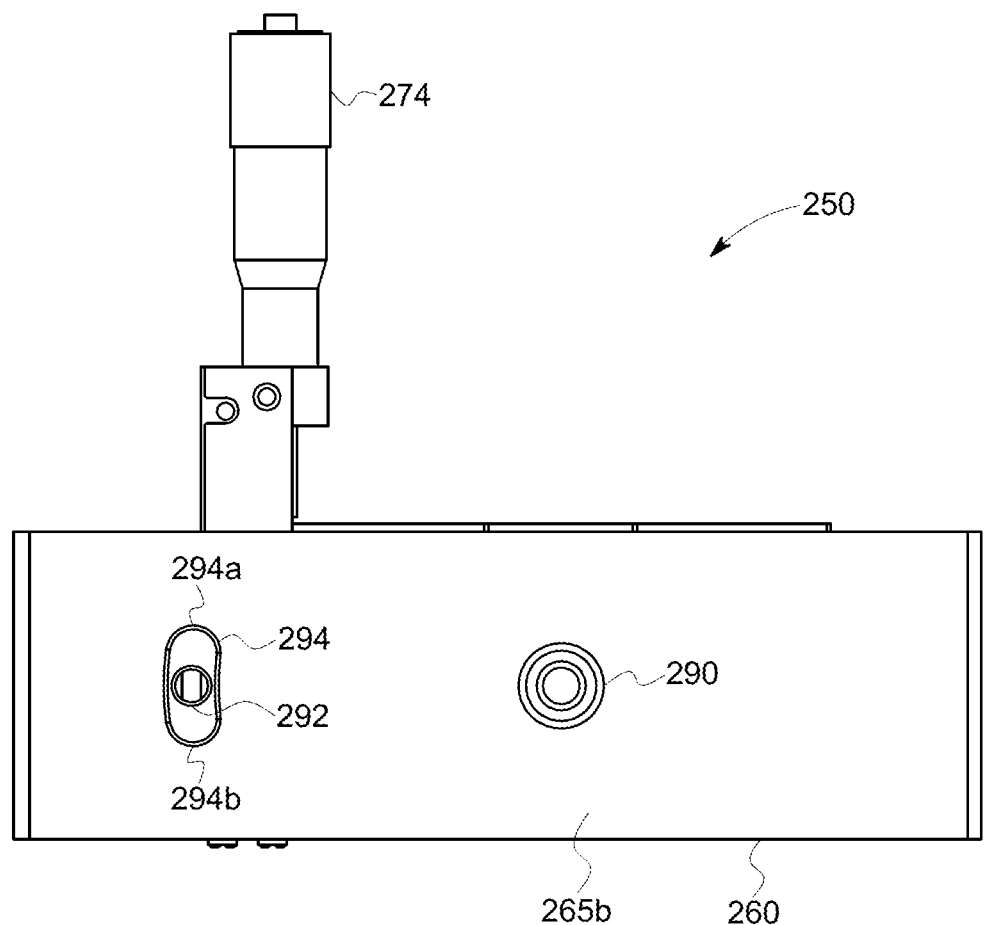
FIG. 2F is a back side view of the sensor assembly shown in FIG. 2A.

In some embodiments the amount of rotation of the second member 258 relative to the third member 260 can be limited in a manner similar to that described above with regard to rotation of the first member 256. As shown in FIGS. 2B and 2F, the second arm 258b of the second member 258 can include another bore 292 that can align with an elongated slot 294 in the first arm 260a of the third member 260. The bore 292 can extend from the inner surface 259c of the second arm 258b of the second member 258 to the outer surface 259d of the second arm 258b of the second member 258. The elongated slot 294 can extend from the inner surface 265a of the first arm 260a of the third member 260 to the outer surface 265b of the first arm 260a of the third member. The bore 292 and the elongated slot 294 can receive an elongate member 293 that can be, e.g., a bolt, that can extend from the inner surface 259c of the second arm 258b of the second member 258 to the outer surface 265b of the first arm 260a of the second member 260. The elongated slot 294 can have a radius of curvature that can be approximately equal to a distance from axis X2 to a central axis of the bore 292. Therefore, when the elongate member 293 is inserted therethrough, rotation of the second member 258 can be limited by radial travel of the elongate member 293 between ends 294a, 294b of the elongated slot 294. A distance between the ends 294a, 294b of the elongated slot 294 can be determined based on a desired amount of angular rotation of the second member 258 relative to the third member 260, and the distance from axis X2 to the central axis of bore 292. In some embodiments, the elongate member 293 can be retained within the bore 292 and the elongated slot 294 by a coupling element 295. The coupling element 295 can be, e.g., a nut. The coupling element 295 can be, e.g., a nut. When a desired amount of rotation about axis X2, or pitch, is achieved, the coupling element 295 can be tightened to secure the position of the second member 258 relative to the third member 260.

In order to mate the mounting assembly 250 to a support structure, the second arm 260b of the third member 260 can include bores 296a, 296b, 296c on a proximal facing surface 265d. The bores 296a, 296b, 296c can be threaded and can be used to couple the mounting assembly 250 to an extension arm and/or a rigid support.

Figure 3A:
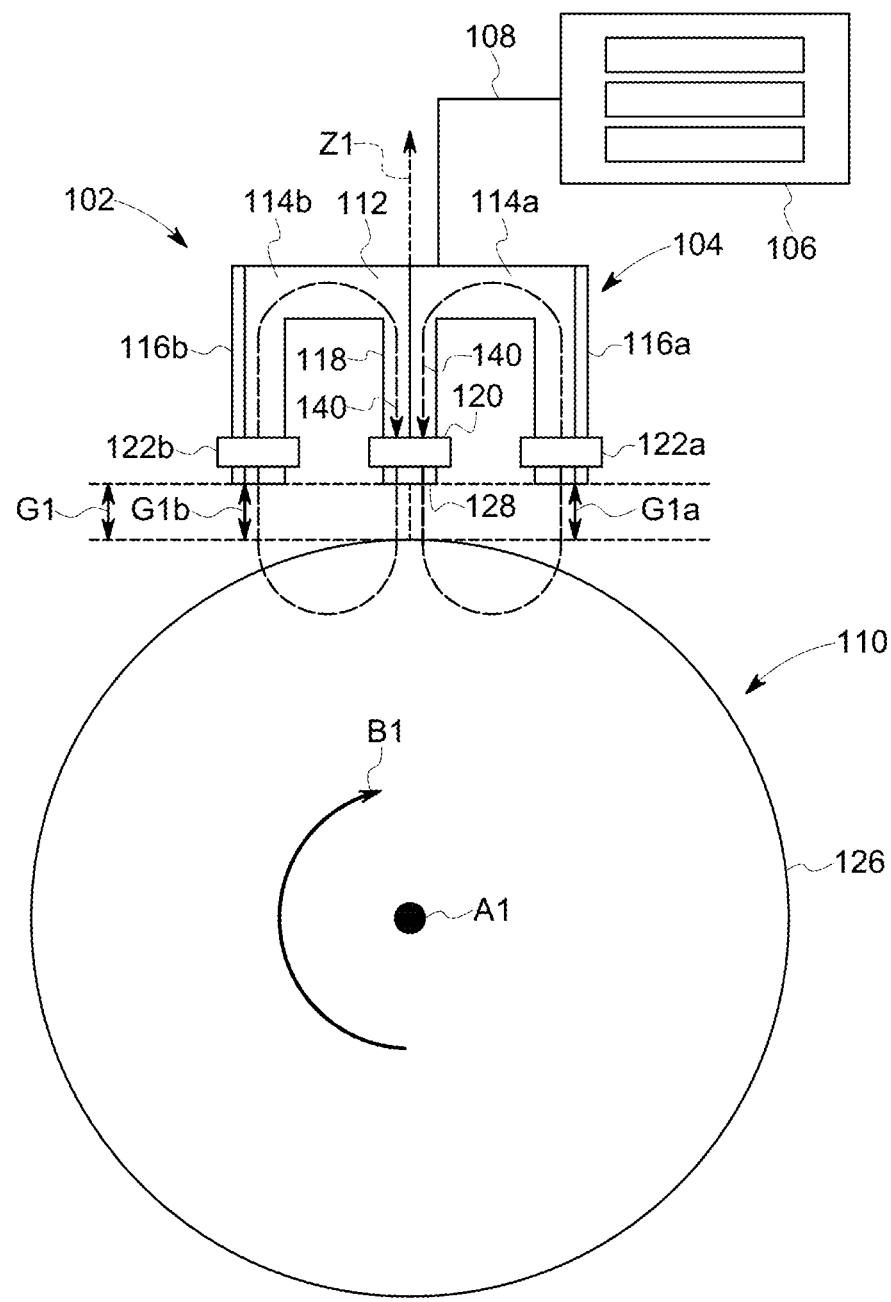
FIG. 3A is a side view of one embodiment sensor head of a sensor assembly.

In use, the mounting assembly 250 can facilitate proper positioning of a sensor head relative to a target. As shown in FIG. 3A, the sensor head 104 can be positioned above a surface 126 of a target 110, with a gap G1 between a distal end 128 of the central arm 118 and the surface 126 of the target 110. Similarly, each of the detection arms 116a, 116b, 116c, 116d can have corresponding gaps G1a, G1b, G1c, G1d between distal ends of the arms and the surface 126 of the target 110, in the direction parallel to the Z1 axis, as illustrated in FIGS. 1C and 3A. The control and processing module 106 can deliver an input drive signal to the drive element 120 such that a magnetic flux 140, corresponding to a magnetic field, can be generated in the central arm 118 of the support 112. The input drive signal can be, e.g., an alternating current (AC) signal. The magnetic flux 140 can travel from the central arm 118, through the gap G1, through the target 110, through the detection arms 116a, 116b, 116c, 116d and back to the central arm 118 to form magnetic loops. As the magnetic flux 140 travels through the detection arms 116a, 116b, 116c, 116d the detection elements 122a, 122b, 122c, 122d can detect the magnetic flux 140, and generate raw stress signals which can be delivered to the control and processing module 106. Magnetic properties, such as magnetic permeability, of the target 110 can change as a result of a change in stress within target 110. Therefore, changes in the detected magnetic flux 140 can correspond to changes in the stress within target 110. The raw stress signals can correspond to magnitudes of stress within the target 110 and can be used to calculate values of stress within the target 110.

Although changes in the detected magnetic flux 140 can correspond to changes in the stress state of the target 110, the detected magnetic flux 140 can also be sensitive to the position and orientation of the sensor relative to the surface 126 of the target 110. As one example, the raw stress signals, corresponding to the detected magnetic flux 140, can be a function of a stress state of the target 110 as well as the size of gap G1. Accordingly, in some embodiments, a proximity sensor element can be used to determine the size of gap G1 so that the raw stress signals can be corrected based on the size of the gap G1, and a corrected stress signal can be determined.

The raw stress signals can also vary with a size of gaps G1a, G1b, G1c, G1d between distal ends of detection arms 116a, 116b, 116c, 116d and the surface 126 of the target 110. As an example, for a given gap G1, gaps G1a, G1b, shown in FIG. 3A, can have different sizes. In one embodiment, as the size of gap G1*a* is increased, the value of the raw stress signal from the detection element 122*a* can decrease. For example, in one embodiment, as the size of gap G1*a* is increased, the value of the raw stress signal from the detection element 122*a* decreases. Since the raw stress signals can be dependent on the position and orientation of the sensor assembly 102 relative to the target, it can be desirable to align the sensor assembly relative to the target 110 using a mounting assembly such as mounting assembly 250. Such an alignment may help to ensure that approximately equal changes in the size of gaps G1*a*, G1*b*, G1*c*, G1*d* can result in approximately equal changes in the raw stress signals from the detection elements 122*a*, 122*b*, 122*c*, 122*d*.

Figure 3B:
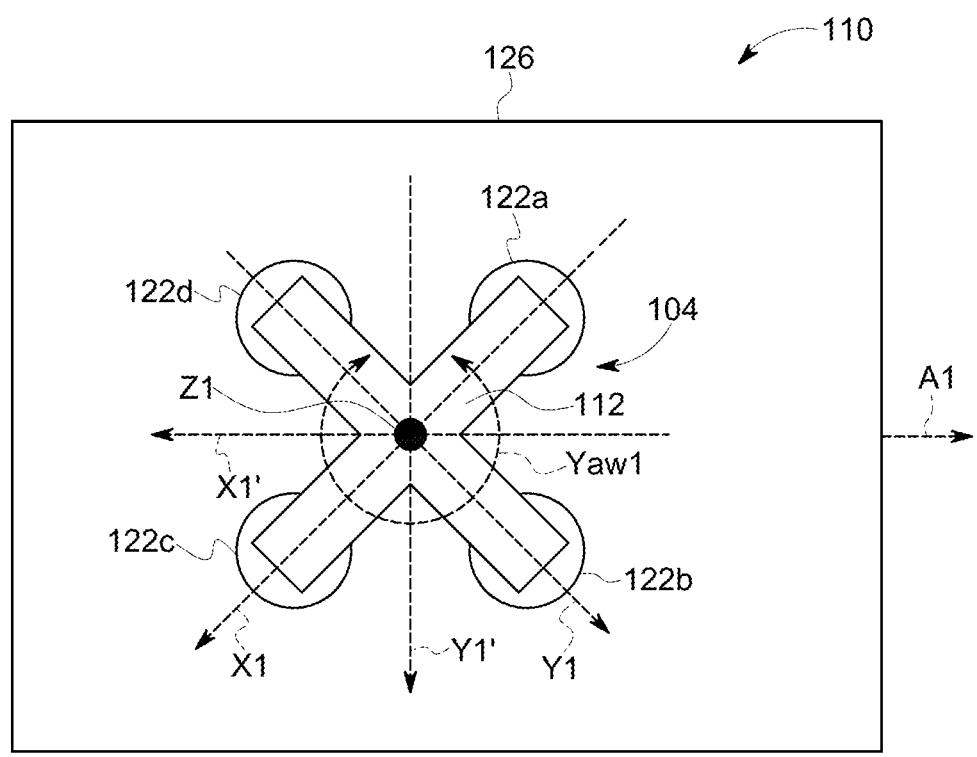
FIG. 3B is a top view of the sensor head shown in FIG. 3A.

Accordingly, initially the sensor assembly 102 can be mechanically aligned using, e.g, a v-block, to achieve an initial alignment between the sensor assembly 102 and the target 110. In some instances, to achieve a more sensitive alignment, the sensor assembly 102 can be inserted into the central bore 266 of the retaining element 252 and rotated about axis Z1 to adjust a yaw of the sensor assembly, as indicated by Yaw1, shown in FIGS. 1C and 3B. In some embodiments, axis Z1 can correspond to axis Z2, as described with regard to mounting assembly 250. The yaw of the sensor assembly 102 can be adjusted such that axes X1, Y1 align with axes X2, Y2 as described above. In other embodiments, the yaw of the sensor assembly can be adjusted such that axes X1', Y1', align with axes X2, Y2, where axes X1', Y1' can be offset from axes X1, Y1 by approximately 45°. In some embodiments, axis X1, Y1 can be approximately orthogonal to each other. Similarly, axes X1', Y1' can be approximately orthogonal to each other. The sensor assembly 102 can then be secured within the retaining element 252 as described above. When the sensor assembly is in secured within the mounting assembly 250, the input drive signal can be delivered to the drive element 120, and raw stress signals can be measured by detection elements 122*a*, 122*b*, 122*c*, 122*d*.

A pitch and roll of the sensor assembly 102 can be adjusted independently by rotating the sensor assembly about axes X1, Y1, as indicated by arrows P1, R1. In other words, the bracket can allow the user to adjust sensor pitch while keeping sensor roll substantially unchanged, and vice versa. For example, the second member 258 of the mounting assembly 250 can be rotated relative to the third member 260 at the second pivot 264 to adjust the pitch of the sensor assembly 102. Adjusting the pitch of the sensor assembly can change the relative sizes of gaps G1*b*, G1*d*. For example, by increasing the size of gap G1*b*, the gap G1*d* can decrease by a corresponding amount while keeping G1*a* and G1*c* nominally unchanged. Therefore, detection element 122*b* can be moved in the proximal direction away from the surface 126 of the target 110, and detection element 122*d* can be moved in the distal direction toward the surface 126 of the target 110. Alternatively, the size of gap G1*b* can be decreased, and the size of gap G1*d* can be increase by a corresponding amount. Therefore, detection element 122*b* can be moved in the distal direction toward the surface 126 of the target 110, and detection element 122*d* can be moved in the proximal direction away from the surface 126 of the target 110.

Similarly, the roll of the sensor assembly can be adjusted by rotating the first member 256 of the sensor assembly 250 relative to the second member 258. Adjusting the roll of the sensor assembly can change the relative sizes of gaps G1*a*, G1*c*. For example, by increasing the size of gap G1*a*, the size of gap G1*c* can decrease by a corresponding amount.

Therefore, detection element 122*a* can be moved in the proximal direction away from the surface 126 of the target 110, and detection element 122*c* can be moved in the distal direction toward the surface 126 of the target 110. Alternatively, the size of gap G1*a* can be decreased, and the size of gap G1*c* can be increase by a corresponding amount while keeping G1*b* and G1*d* nominally unchanged. Therefore, detection element 122*a* can be moved in the distal direction toward the surface 126 of the target 110, and detection element 122*c* can be moved in the proximal direction away from the surface 126 of the target 110. Therefore, pitch and roll of the stress sensor can be adjusted independently. Holding one axis fixed while rotating about another means that pitch and roll can be changed independently. This can greatly decrease the time necessary to install and align the stress sensor. The pitch and roll of the sensor assembly can be maintained by securing the positions of the elongate members 283, 293 in curved slots 284, 294, using coupling elements 285, 295, as described above.

Additionally, the sensor assembly 102 can be moved in the proximal and distal directions by adjusting the position of the retaining element 252. For example, the adjuster 274 of the mounting assembly 250 can be rotated to move the sensor assembly 102 proximally or distally along axis Z1 relative to the surface 126 of the target 110, thereby changing the sizes of gaps G1, G1*a*, G1*b*, G1*c*, G1*d*, by a uniform amount.

Between each pitch and roll adjustment, raw stress signals can be measured. The sensor can be moved proximally or distally and raw stress signals can be measured again. The process can be repeated until changes in raw stress signals from each of the detection elements 122*a*, 122*b*, 122*c*, 122*d* are approximately equal when the sensor assembly 102 is moved proximally or distally over a given range.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and. B and C together." In addition, use of the term "based on," above and in the claims is intended to mean, "based at least in part on," such that an unrecited feature or element is also permissible.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

What is claimed is:

1. A sensor mounting assembly, comprising:
a retaining element configured to releasably engage a sensor assembly;
an adjustment assembly coupled to the retaining element and having a rotatable member configured to cause translation of the retaining element along a first axis; and
a frame assembly having a first member coupled to the adjustment assembly, a second member pivotally coupled to the first member about a second axis extending transverse to the first axis, and a third member pivotally coupled to the second member about a third axis extending transverse to the first and second axes, wherein pivotal movement of the first member relative to the second member is configured to cause rotation of the retaining element about the second axis, and wherein pivotal movement of the second member relative to the third member is configured to cause rotation of the retaining element about the third axis.

2. The assembly of claim 1, wherein the first axis comprises a vertical Z-axis, the second axis comprises a horizontal X-axis, and the third axis comprises a horizontal Y-axis.

3. The assembly of claim 1, wherein the second axis is approximately orthogonal to the third axis.

4. The assembly of claim 1, wherein the adjustment assembly includes a movable member that is slidably coupled to a frame, the retaining element being coupled to the movable member for movement therewith.

5. The assembly of claim 4, wherein the movable member is disposed between the frame and the first member.

6. The assembly of claim 4, wherein the first axis extends perpendicular to the second and third axes.

7. The assembly of claim 1, wherein the retaining element comprises a clamp configured to engage a sensor assembly.

8. The assembly of claim 1, wherein pivotal movement of the first member relative to the second member is limited.

9. The assembly of claim 8, wherein the first member includes a bore, and the second member includes an elongated slot, and wherein an elongated member extends through the bore and the elongated slot at a location offset from the first axis such that the elongated member limits pivotal movement of the first member relative to the second member by a distance equal to a length of the elongates slot.

10. The assembly of claim 1, wherein the first member is pivotally coupled to the second member by a first pivot coupling that extends through a first pivot bore in the first member and a second pivot bore in the second member.

11. The assembly of claim 1, wherein the second member is pivotally coupled to the third member by a second pivot coupling that extends through a third pivot bore in the second member and a fourth pivot bore in the third member.

12. A sensor assembly, comprising:
a sensor housing having a first pair of detection elements that define a first detection axis, and a second pair of detection elements that define a second detection axis;
a sensor mount including
an adjustment mechanism having a frame and a movable member slidably coupled to the frame,
a retaining element coupled to and slidably movable with the movable member of the adjustment mechanism, the retaining element being configured to releasably engage the sensor housing,
a first member coupled to the frame of the adjustment mechanism,
a second member pivotally coupled to the first member about a first axis aligned with the first detection axis, wherein pivotal movement of the first member relative to the second member about the first axis pivotally moves the sensor housing about the first detection axis, and
a third member pivotally coupled to the second member about a second axis aligned with the second detection axis, wherein pivotal movement of the second member relative to the third member about the second axis pivotally moves the sensor housing about the second detection axis.

13. The sensor assembly of claim 12, wherein the adjustment mechanism includes a rotatable member configured to cause slidable movement of the movable member along the frame.

14. The sensor assembly of claim 12, wherein the first member includes first and second bores, and the second member includes a third bore and a first elongated slot, the first bore being aligned with the third bore along the first axis, and the second bore being aligned with the first elongated slot, wherein an elongated member is disposed through the second bore and the first elongate slot for limiting pivotal movement of the first member relative to the second member.

15. The sensor assembly of claim 12, wherein the second axis is approximately orthogonal to the first axis.

16. A method for adjusting a position of a sensor assembly relative to a structure to be tested, comprising:
rotating a sensor housing about a first axis to adjust a yaw of the sensor housing relative to a retaining element having the sensor housing seated therein;
actuating an adjustable member to cause the sensor housing to translate along the first axis;
rotating the retaining element with the sensor housing therein about a second axis to adjust a pitch of the sensor housing; and
rotating the retaining element with the sensor housing therein about a third axis to adjust a roll of the sensor housing.

17. The method of claim 16, wherein actuating the adjustable member causes a movable member mated to the retaining element to slide relative to a frame.

18. The method of claim 16, wherein rotating the retaining element with the sensor housing therein about a second axis causes a first member of a frame assembly coupled to the retaining element to pivot relative to a second member of the frame assembly.

19. The method of claim 18, wherein rotating the retaining element with the sensor housing therein about a third axis causes the second member of a frame assembly to pivot relative to a third member of the frame assembly.

* * * * *